United States Patent [19]
Toyoda et al.

[11] Patent Number: 5,163,316
[45] Date of Patent: Nov. 17, 1992

[54] APPARATUS FOR DETECTING FLAMEOUT OF INTERNAL COMBUSTION ENGINE

[75] Inventors: Katsuhiko Toyoda; Masahiro Hosoi, both of Shizuoka, Japan

[73] Assignee: Suzuki Motor Corporation, Shizuoka, Japan

[21] Appl. No.: 758,807

[22] Filed: Sep. 12, 1991

[30] Foreign Application Priority Data

Sep. 29, 1990 [JP] Japan .................................. 2-262607

[51] Int. Cl.$^5$ .......................................... G01M 15/00
[52] U.S. Cl. ........................................ 73/117.3; 60/277
[58] Field of Search ............... 73/117.3, 116; 123/440; 60/277

[56] References Cited
U.S. PATENT DOCUMENTS

3,908,366 9/1975 Masaki ........................... 73/117.3 X

Primary Examiner—Jerry W. Myracle
Attorney, Agent, or Firm—Flynn, Thiel, Boutell & Tanis

[57] ABSTRACT

An apparatus for detecting a flameout in an internal combustion engine includes a rotational speed sensor for detecting engine rotational speed and for generating an electrical signal corresponding to the engine rotational speed. A sensor is provided for detecting the air-fuel ratio of the engine exhaust gas and for generating an output electrical signal corresponding to the air-fuel ratio. An engine load sensor arrangement detects a load state of the internal combustion engine and generates an output electrical signal corresponding to the load state. A control arrangement is provided for comparing the output signal from the exhaust gas sensor with the output signal from the engine load sensor arrangement when the exhaust gas sensor indicates a lean mixture. The control arrangement uses this comparison information to determine whether a flameout has occurred. The control arrangement is also capable of accommodating a response or delay time associated with the exhaust gas sensor.

8 Claims, 5 Drawing Sheets

APPARATUS FOR DETECTING FLAMEOUT OF INTERNAL COMBUSTION ENGINE

FIELD OF THE INVENTION

This invention relates to an apparatus for detecting a flameout in an internal combustion engine and, more particularly, to an apparatus which detects flameout early, whereby to prevent a large quantity of uncombusted gas from being discharged into the atmosphere to improve the durability of the catalyst device.

BACKGROUND OF THE INVENTION

In the internal combustion engine of a vehicle, an air-fuel mixture is made lean and the engine is operated, thereby reducing the generation of harmful exhaust gas components and improving fuel consumption.

If the air-fuel mixture is too lean, however, defective combustion occurs in the combustion chamber and uncombusted gas can flow into the exhaust system side and cause occurrence of a "flameout" (that is, combustion of fuel occurs in the exhaust system at a location outside of the combustion chamber). If a flameout occurs as mentioned above, damage to or deterioration in the function of the catalyst device or the like occurs. Therefore, a fuse sensor is attached on the downstream side of the catalyst device (i.e., catalytic converter) and when the temperature of the catalyst device rises to a set value or higher due to the flameout, then the fuse sensor detects such a temperature state, and such temperature state is displayed by a meter or a warning lamp on a panel, thereby informing the operator of the occurrence of the flameout.

Such a flameout detecting apparatus and a control apparatus for an internal combustion engine are disclosed in, for example, JP-A-55-137342 and JP-A-2-55859. According to the apparatus disclosed in JP-A-55-137342, by controlling an air-fuel ratio by detecting outputs corresponding to an exhaust pressure state from an exhaust pressure sensor and an engine rotational speed state, a limitative leaning process of the air-fuel mixture can be realized without causing a flameout. According to the apparatus disclosed in JP-A-2-55859, a flameout is detected by using a fluctuation amount at the time of rotation upon idling.

The apparatus disclosed in JP-A-55-137342 has disadvantages in that it is necessary to newly provide a special exhaust pressure sensor to detect a flameout and the costs increase and the construction becomes complicated.

In the apparatus disclosed in JP-A-2-55859, although a rotation fluctuation is used as a parameter for the flameout detection, in using such a parameter, there is a disadvantage in that the flameout detection cannot be discriminated in a high rotational speed range exceeding about 3,000 r.p.m. due to problems of vibration or the like.

Further, in a vehicle having a catalyst apparatus, there are disadvantages in that the temperature of the catalyst device abnormally rises during the flameout due to a delay in detection of the flameout, so that deterioration of the catalyst device occurs early and the durability of the catalyst device deteriorates and, in the worst case, the catalyst device is broken.

Further, there is a disadvantage in that a purification ratio of the exhaust gas from the internal combustion engine deteriorates due to deterioration of or damage to the catalyst device, and environmental pollution therefore increases.

In an attempt to eliminate the above disadvantages, it is an object of the present invention to provide an apparatus for detecting a flameout of an internal combustion engine comprising: a rotational speed sensor to detect the engine rotational speed of the internal combustion engine; an A/F sensor to detect the air-fuel ratio of the exhaust gas; an engine load sensor to detect the load state of the internal combustion engine; and control means for comparing an output signal from the A/F sensor and an output signal from the engine load sensor when the A/F sensor has generated a lean signal, for discriminating a flameout state, and for controlling so as to accommodate a response speed of the A/F sensor determined in accordance with the output signals of the rotational speed sensor and the engine load sensor, wherein a flameout is detected early to prevent a large quantity of uncombusted gas from being discharged into the atmosphere due to the flameout and for preventing deterioration of or damage to the catalyst device.

The invention comprises: a rotational speed sensor for detecting the rotational speed of the internal combustion engine and for generating an electric signal corresponding to the engine rotational speed; an A/F sensor for detecting the air-fuel ratio of the exhaust gas and for generating an electric signal corresponding to the air-fuel ratio; an engine load sensor for detecting the load state of the internal combustion engine and for generating an electric signal corresponding to the load state; and control means for comparing the output signal from the A/F sensor and the output signal from the engine load sensor when the A/F sensor has generated a lean signal, for discriminating a flameout state, and for controlling response speed of the A/F sensor in accordance with the output signals of the rotational speed sensor and the engine load sensor.

According to the construction of the invention, when the A/F sensor generates a lean signal, the control means respectively receive the output signals from the A/F sensor and the engine load sensor and compares the output signals to thereby discriminate a flameout state, the control means also controls so as to correct the response speed of the A/F sensor in accordance with the output signals from the rotational speed sensor and the engine load sensor and detects early the occurrence of the flameout and can execute a countermeasure to promptly prevent continuation of the flameout. Therefore, it can be prevented that a large quantity of uncombusted gas is discharged into the atmosphere. Deterioration of or damage to the catalyst device can also be prevented. The durability and useful life of the catalyst device is improved.

BRIEF DESCRIPTION OF THE DRAWINGS

An embodiment of the invention will be described in detail hereinbelow on the basis of the drawings, in which.

DETAILED DESCRIPTION

Figure 1:
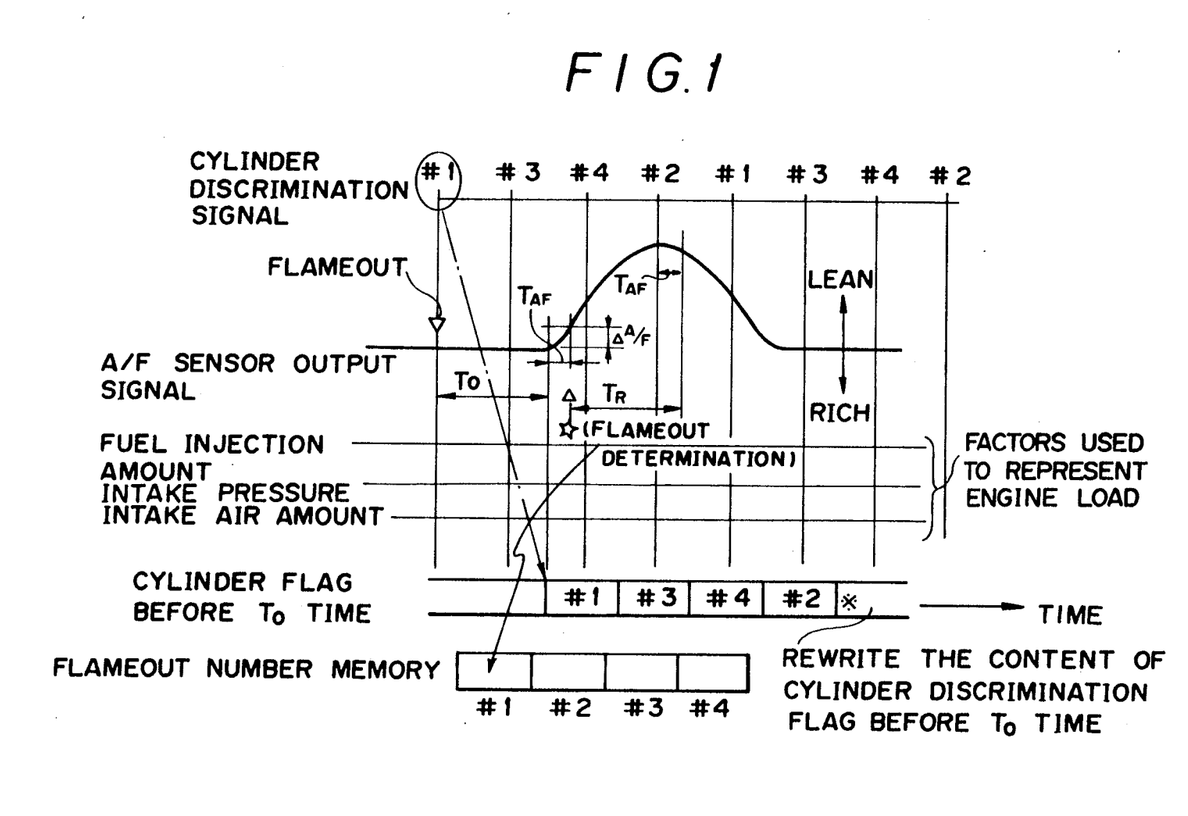
FIG. 1 is a time chart showing flameout detection and flameout cylinder discrimination of an internal combustion engine, as performed by the present invention.
Figure 2:
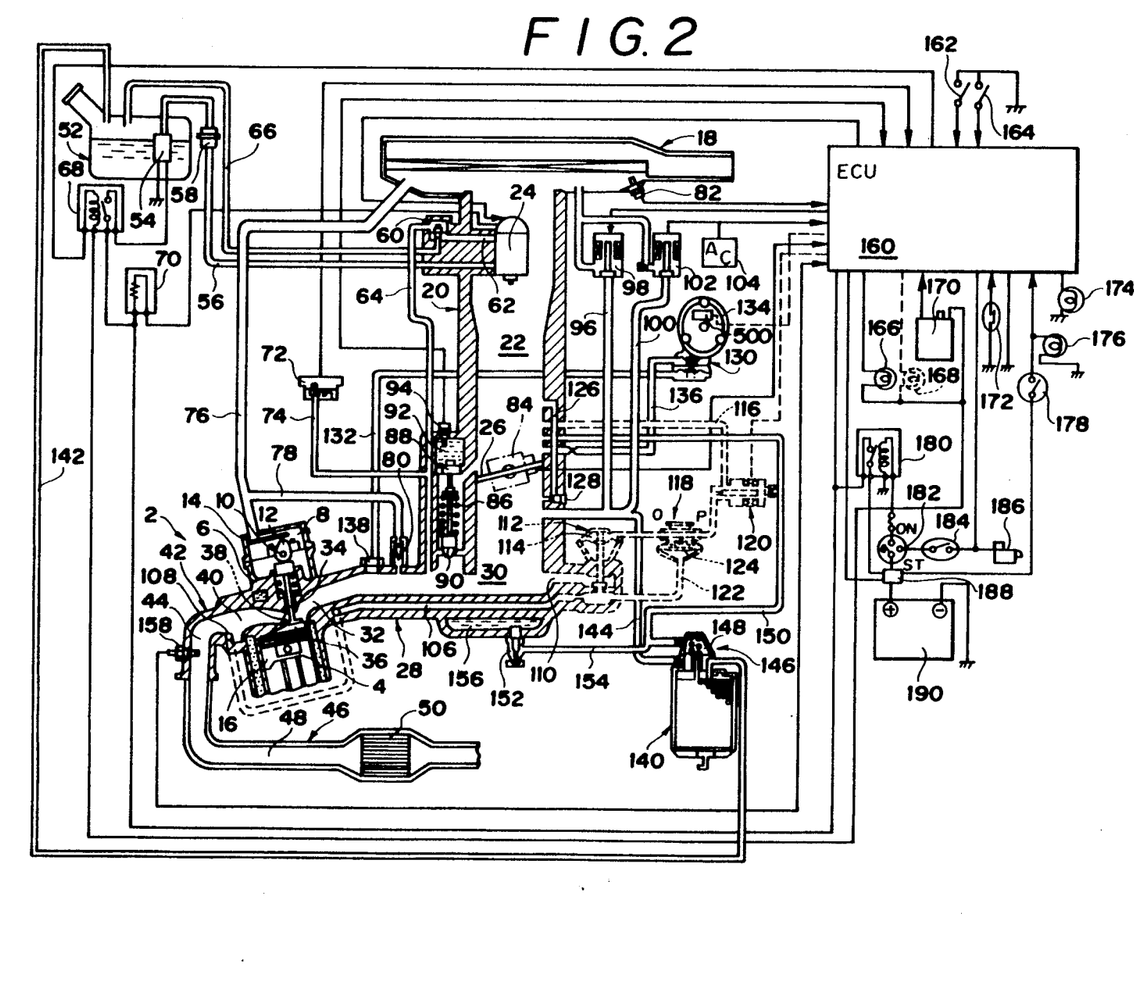
FIG. 2 is a schematic diagram of a flameout detecting apparatus which performs the functions illustrated in FIG. 1.
Figure 3:
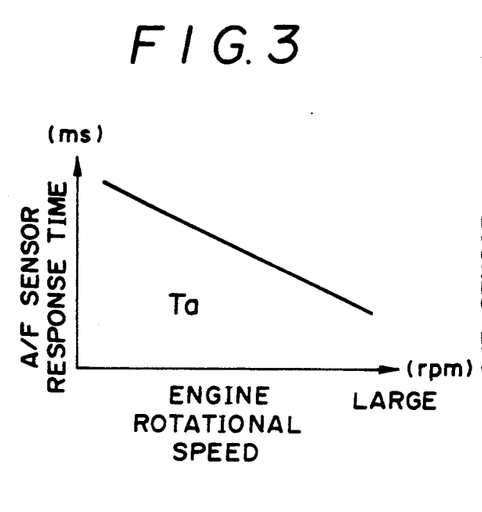
FIG. 3 is a diagram showing the relation between the response time of an A/F sensor and the engine rotational speed.
Figure 4:
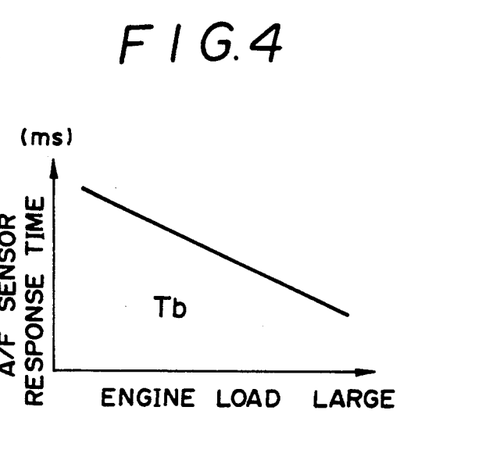
FIG. 4 is a diagram showing the relation between the response time of the A/F sensor and the engine load.
Figure 5:
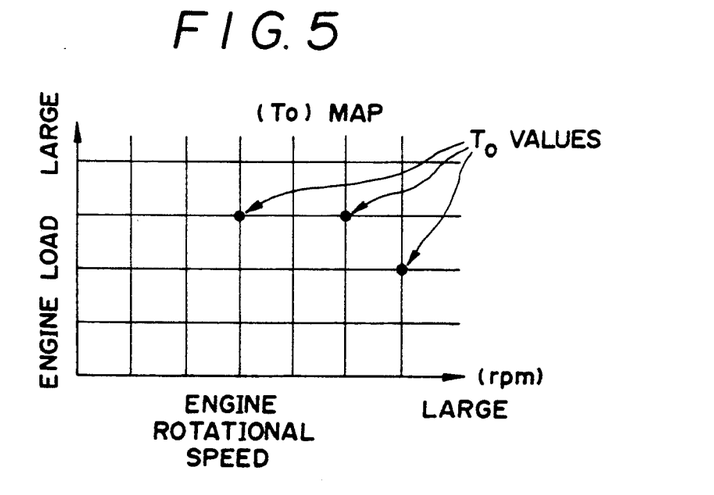
FIG. 5 is a map used to obtain a response delay time $T_0$ of the A/F sensor.

FIGS. 1 to 8 show an embodiment of the invention. In FIG. 2, reference numeral 2 denotes an internal combustion engine of, e.g., four cylinders; 4 a cylinder block; 6 a cylinder head; 8 a valve moving mechanism; 10 a cam shaft of the valve moving mechanism 8; 12 a cam attached to the cam shaft 10; 14 a cylinder head cover; 16 a piston; 18 an air cleaner; 20 a throttle body; 22 a body intake passage; 24 a fuel injection valve; 26 a throttle valve; 28 an intake manifold; 30 a manifold intake passage; 32 an intake port; 34 an intake valve; 36 a combustion chamber; 38 an exhaust valve; 40 an exhaust port; 42 an exhaust manifold; 44 a manifold exhaust passage; 46 an exhaust pipe; 48 a pipe exhaust passage; and 50 a catalyst device.

The fuel injection valve 24 is arranged in the intake passage 22 on the upstream side of the throttle valve 26. One end of a fuel supply passage 56 is connected to a fuel pump 54 in a fuel tank 52. The other end of the fuel supply passage 56 is connected to the fuel injection valve 24. A fuel filter 58 to eliminate impurities contained in fuel from the fuel tank 52 is arranged between the ends of the fuel supply passage 56.

A fuel leading passage 62 communicated with a fuel pressure regulator 60 is connected to the fuel injection valve 24. The fuel pressure regulator 60 adjusts the fuel pressure which acts on the fuel injection valve 24 to a constant value. The fuel pressure regulator 60 is made operative by an intake pipe pressure from a fuel pressure adjusting pressure passage 64 communicated with the manifold intake passage 30 on the downstream side of the throttle valve 26.

A return fuel passage 66 which opens into the fuel tank 52 is further connected to the fuel pressure regulator 60.

The fuel pump 54 is made operative and is controlled by a fuel pump relay 68. The fuel pump relay 68 is connected to a fuel injection valve register 70. The fuel injection valve register 70 is connected to the fuel injection valve 24.

A pressure passage 74 is communicated with an intake pressure sensor 72 which detects an intake pipe pressure of the manifold intake passage 30. Passage 74 is connected to the pressure passage 64 to adjust the fuel pressure. The intake pressure sensor 72 functions as an engine load sensor to detect a load state of the internal combustion engine 2 of a fuel injection amount, an intake air amount, an intake pressure, or the like as a typical factor.

A blow-by gas reflux passage 76 communicates with the inside of the air cleaner 18 on the clean air side thereof and is connected to the cylinder head cover 14. One end of a blow-by gas reflux passage 78 on the manifold side is connected to the blow-by gas reflux passage 76 between air cleaner 18 and cylinder head cover 14. The other end of the blow-by gas reflux passage 78 is connected to a PCV valve 80 attached to the intake manifold 28 in order to adjust a blow-by gas amount to the manifold intake passage 30.

An intake air temperature sensor 82 to detect intake air temperature is attached to the air cleaner 18.

A throttle sensor 84 to detect the opening/closing state of the throttle valve 26 is connected to the throttle valve 26. An air bypass passage 86 is formed in the intake manifold 28 so as to communicate the body intake passage 22 with the manifold intake passage 30 by bypassing the throttle valve 24. An air valve 90 arranged in the air bypass passage 86 is made operative by a heat sensitive operating element 88 so as to open or close the air bypass passage 86. The heat sensitive operating element 88 operates in accordance with the temperature of the engine cooling water flowing in a first cooling water passage 92 formed in the intake manifold 28.

A water temperature sensor 94 to detect a temperature of the engine cooling water in the first cooling water passage 92 is attached to the intake manifold 28.

One end of a first pressure bypass passage 96 opens into the manifold intake passage 30 on the downstream side of the throttle valve 26. The other end of the first pressure bypass passage 96 communicates into the air cleaner 18. A solenoid valve 98 to control idling speed is connected between the ends of the first pressure bypass passage 96.

One end of a second pressure bypass passage 100 is connected to the one end of the first pressure bypass passage 96. The other end of the second pressure bypass passage 100 is connected to the other end of the first pressure bypass passage 96. A pressure switching valve (VSV) 102 for an air conditioner is connected between the ends of the second pressure bypass passage 100. An amplifier 104 for the air conditioner is connected to the pressure switching valve 102 for the air conditioner.

An EGR intake port 108 as one end of an EGR reflux passage 106 opens into the manifold exhaust passage 44. An EGR reflux port 110 as the other end of the EGR reflux passage 106 opens into the manifold intake passage 30 on the downstream side of the throttle valve 26. An EGR adjusting valve 112 is arranged between the ports 108 and 110 of the EGR reflux passage 106. A pressure passage 116 for operating the EGR adjusting valve 112 is communicated with a pressure chamber 114 of the EGR adjusting valve 112.

The operating pressure passage 116 communicates the pressure chamber 114 of the EGR adjusting valve 112 and the body intake passage 22 on the upstream side of the throttle valve 26. An EGR modulator 118 and a pressure switching valve 120 for EGR control are sequentially arranged along the operating pressure passage 116 proceeding from the EGR adjusting valve 112 toward passage 22. The EGR modulator 118 controls pressure which acts on the pressure chamber 114 of the EGR adjusting valve 112 by allowing exhaust pressure from the EGR reflux passage 106 to act on an internal diaphragm chamber 124 through a pressure passage 122. The pressure switching valve 120 for EGR control opens or closes the operating pressure passage 116 between EGR regulator 118 and passage 22.

A slow bypass passage 126 is formed in the throttle body 20 so as to communicate the body intake passage 22 20 and the manifold intake passage 30 by bypassing the throttle valve 26. An idling adjusting screw 128 is also provided in passage 126 to adjust the opening/closing state thereof.

A vacuum pressure passage 136 is communicated with a vacuum controller 130 and with the body intake passage 22 slightly upstream of the throttle valve 26. A distributor 134 having, for example, a rotational speed sensor 500 to generate a detection signal representing engine rotational speed, is also connected to the vacuum controller 130. The vacuum controller 130 is made operative by an intake pipe pressure supplied from the manifold intake passage 30 by a pressure passage 132. The pressure passage 132 for the controller is connected to the passage 30 via a gas filter 138 attached to the intake manifold 28 on the downstream side of the throttle valve 26.

An evaporation fuel passage 142 is connected into a canister 140 having an adsorbent therein, and is communicated with the fuel tank 52. A purge passage 144 to lead separated evaporation fuel to the manifold intake passage 30 is connected between the canister 140 and the one end of the second pressure bypass passage 100.

The canister 140 has an evaporation fuel control valve 146 to adjust an amount of separated evaporation fuel. A pressure passage 150 supplies intake pressure from the upstream side of the throttle valve 126 to a pressure chamber 148 for control of the evaporation fuel control valve 146. A pressure communicating passage 154 is communicated with a water temperature sensing valve 152 attached to the intake manifold 28, and is communicated with the pressure passage 150 for control. The water temperature sensing valve 152 is made operative in accordance with the temperature of the cooling water in a second cooling water passage 156 formed in the intake manifold 28.

An A/F sensor 158 for detecting the air-fuel ratio of the exhaust gas and for generating an electric signal representative thereof is attached to the exhaust manifold 42. Generally, a sensor output voltage of the linear A/F sensor is in almost direct proportion to the air-fuel ratio.

The fuel injection valve 24, fuel pump relay 68, fuel injection resistor 70, intake pressure sensor 72, intake air temperature sensor 82, throttle sensor 84, water temperature sensor 94, solenoid valve 98 to control the idling speed, pressure switching valve 102 for the air conditioner, amplifier 104 for the air conditioner, pressure switching valve 120 for the EGR control, distributor 134, and A/F sensor 158 are connected to a control means (ECU) 160. It will be evident from the following description that the ECU 160 may be implemented using a conventional microprocessor circuit.

When the A/F sensor 158 generates an output signal indicating a lean air-fuel mixture, the control means 160 compares the A/F sensor output signal to the output signal from the intake pressure sensor 72, which functions as an engine load sensor, thereby discriminating a flameout state. The control means 160 also controls so as to accommodate a response speed of the A/F sensor 158 determined in response to output signals of the rotational speed sensor 500 and the intake pressure sensor 72.

Explaining in detail, the control means 160 has four functions comprising the flameout discriminating function, accommodation of the response speed of A/F sensor 158, a continuous flameout discriminating function, and a function of discriminating the cylinder in which a flameout has occurred.

According to the flameout discriminating function of the control means 160, when the A/F sensor 158 generates a lean signal, that is, when an A/F change amount $\Delta A/F$ (see FIG. 1) is equal to or larger than a flameout discrimination amount DAF, the output signal from the A/F sensor 158 is compared with the output signal from the intake pressure sensor 72, thereby determining a flameout state in the case where the A/F change amount $\Delta A/F$ doesn't change at almost the same rate as the output signal from intake pressure sensor 72.

According to the A/F sensor response speed accommodating function of the control means 160, when $\Delta A/F \geq DAF$, correction and control are performed so as to obtain a proper A/F sensor response speed in accordance with the output signals of the rotational speed sensor 500 and the intake pressure sensor 72. The proper response speed of the A/F sensor 158 is determined by obtaining a response delay time $T_0$ (FIG. 1) associated with the A/F sensor. The response delay time $T_0$ of the A/F sensor 158 is obtained by the sum of $T_a$ which is calculated from FIG. 3 and $T_b$ which is calculated from FIG. 4 (i.e., $T_0 = T_a + T_b$) or by a $T_0$ map of FIG. 5.

Further, according to the continuous flameout discriminating function of the control means 160, a time $T_R$ (see FIG. 1), which is required until the air-fuel ratio is returned from the lean state to the rich state after the flameout decision, is divided by the response delay time $T_0$ of the A/F sensor 158. If the resulting quotient is equal to or larger than 2, a continuous flameout is discriminated.

Further, according to the discriminating function of the flameout cylinder of the control means 160, the flameout cylinder is discriminated by the response delay time $T_0$ of the A/F sensor 158 and the time $T_R$ which is required until the air-fuel ratio is returned from the lean state to the rich state.

A diagnosis switch 162, a test switch 164, an engine check light 166, a shift-up display light 168, an ignition coil 170, a vehicle speed sensor 172, a diagnosis lamp 174, an illumination light 176, a light switch 178, a main relay 180, a main switch 182, a clutch switch 184, a switch 186 for a starter, a main fuse 188, and a battery 190 are connected to the control means 160, respectively.

Due to this, if a flameout of the internal combustion engine 2 is detected, the control means 160 lights up the diagnosis lamp 174 to thereby inform the flameout to the driver and makes the fuel injection valve 24 operative to thereby execute a cut-out of the fuel or the like, and avoids the flow of uncombusted gas to the exhaust system side, thereby preventing a continued flameout.

The operation of the embodiment will now be described.

FIG. 1 is a time chart showing a state in which a first cylinder #1 of the internal combustion engine 2 has caused a flameout.

In FIG. 1, when a flameout occurs in the first cylinder #1, the flameout is indicated by the output signal of the A/F sensor 158 after the elapse of the response delay time $T_0$. A cylinder flag corresponding to the first cylinder #1 is set to the high level $T_0$ milliseconds after the cylinder discrimination signal first indicates cylinder #1. The occurrence of the flameout is determined after a calculation time $T_{AF}$ during which the A/F change amount $\Delta A/F$ is calculated by the ECU 160. A cumulative total of the number of flameout times is stored for the first cylinder #1. The air-fuel ratio is made lean.

The time $T_R$ which is required until the air-fuel ratio is returned from the lean state to the rich state and which corresponds to a predetermined continuous flameout discrimination time is started from the determination of the flameout.

The flameout detecting operation will now be described on the basis of a flowchart of FIG. 6.

Figure 6:
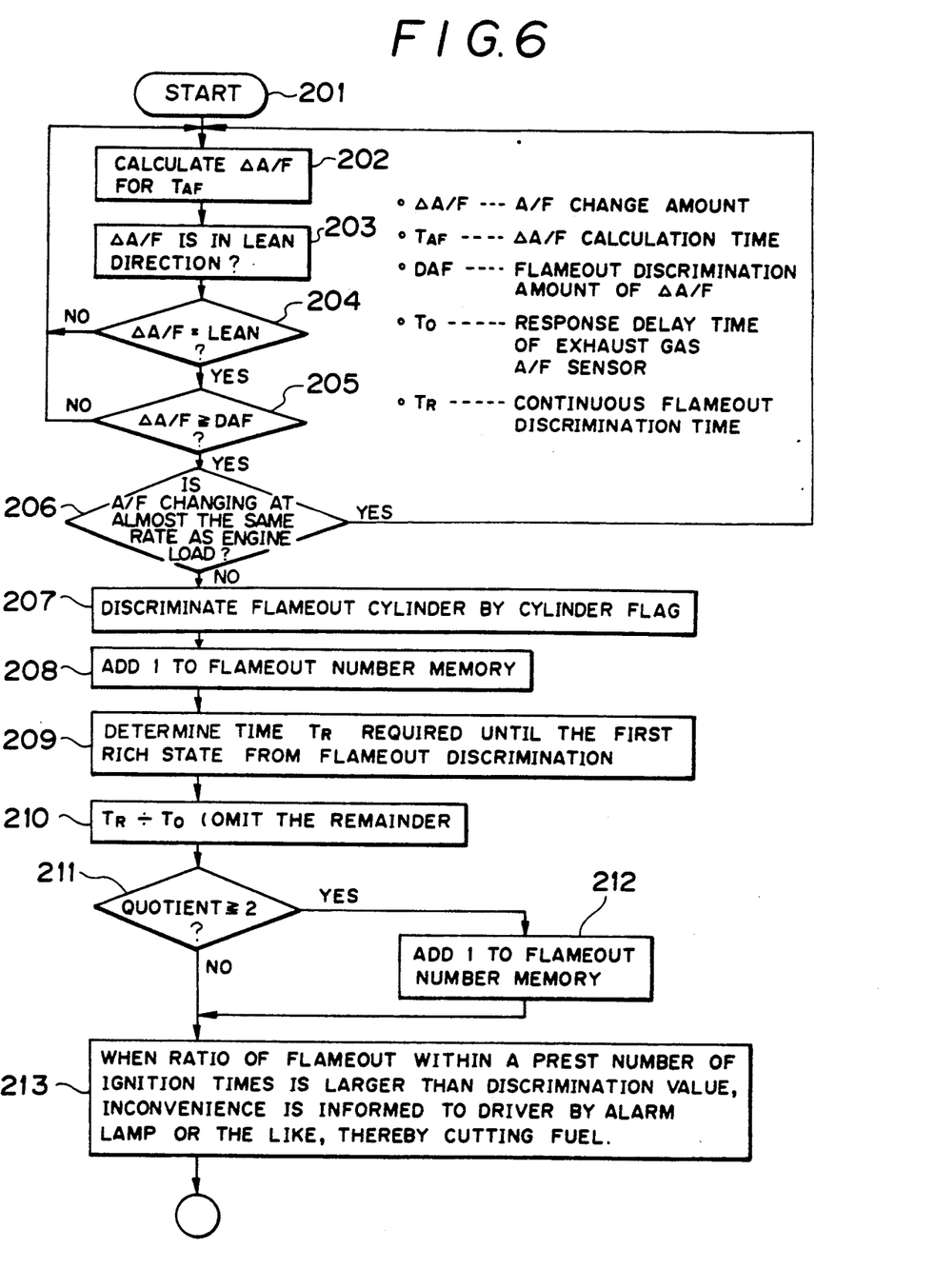
FIG. 6 is a flowchart for explaining the operation of the present invention.

In FIG. 6, after the program of the control means 160 is started at 201 by the start of the internal combustion engine 2, the A/F change amount $\Delta A/F$ during the calculation time $T_{AF}$ is calculated at 202. The processing routine advances to a discriminating step 203 to see if the A/F change amount $\Delta A/F$ is directed to the lean direction or not and a corresponding discrimination step 204 is performed. If the result of the discrimination 204 is NO, the processing routine is returned to the calculating step 202 of the A/F change amount $\Delta A/F$. If YES at 204, the A/F change amount $\Delta A/F$ is compared with the flameout discrimination amount DAF of the A/F, thereby discriminating at 205 whether $\Delta A/F \geq DAF$ or not.

If the result of the discrimination 205 is NO, the processing routine is returned to the calculating step 202 of the A/F change amount $\Delta A/F$ mentioned above. If YES at 205, a detection signal from, for example, the intake pressure sensor 72, representing a load state of the internal combustion engine 2, is compared with the output signal from the A/F sensor 158. Other typical factors which may be taken as representative of the engine load are fuel injection amount (see FIG. 1), intake air amount (see FIG. 1), intake pressure, or the like. In the case where the A/F change amount $\Delta A/F$ does not change at almost the same rate as the selected representative engine load factor, the flameout state is decided at 206. The identity of the flameout cylinder is now discriminated by inspecting the cylinder flag at 207. The cylinder flag is set in accordance with the cylinder discrimination signal and $T_0$ of FIG. 1.

At 208, a "1" is added to a flameout number memory corresponding to the cylinder identified at 207 above. A time which is required until the air-fuel ratio is made rich for the first time from the decision of the flameout, that is, the time $T_R$ (FIG. 1) which is required until the air-fuel ratio is returned from the lean state to the rich state is determined at 209.

The time $T_R$ which is required until the air-fuel ratio is returned from the lean state to the rich state is divided by the response delay time $T_0$ of the A/F sensor 158 at 210 (the remainder is omitted), thereby discriminating at 211 whether the quotient is equal to or larger than 2, that is, $T_R \div T_0 \geq 2$ or not.

If YES at 211, the continuous flameout state is decided and a "1" is added to an appropriate flameout number memory at 212. At step 212, if $2 \leq T_R \div T_0 < 3$, a "1" is added to a flameout number memory corresponding to the next cylinder in the FIG. 1 firing order, namely, the third cylinder #3. If $3 < T_R \div T_0 \leq 4$, a "1" is added to a flameout number memory corresponding to the next successive cylinder in FIG. 1, namely, the fourth cylinder #4.

After completion of the addition to the flameout number memory at 212, or if the result of the discrimination 211 is NO, and if a flameout ratio within a preset number of ignition occurrences is larger than a decision value, an inconvenience is informed to the driver by a warning device such as an alarm lamp or the like and the fuel supply is cut.

Figure 7:
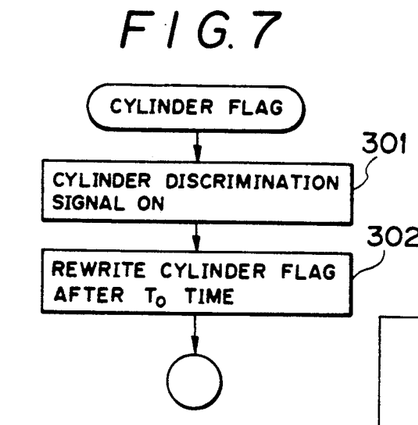
FIG. 7 is a flowchart for explaining how the invention uses a cylinder discrimination flag.

The use of the cylinder discrimination flag will now be described with reference to the flowchart of FIG. 7.

First, a cylinder discrimination signal (FIG. 1) from the distributor 134 or a crank sensor or the like is fetched and enabled at 301. After the elapse at 302 of the response delay time $T_0$ of the A/F sensor 158, the cylinder discrimination flag in the control means 160 is written as a $T_0$-delayed representation of the cylinder discrimination signal (see FIG. 1).

Figure 8:
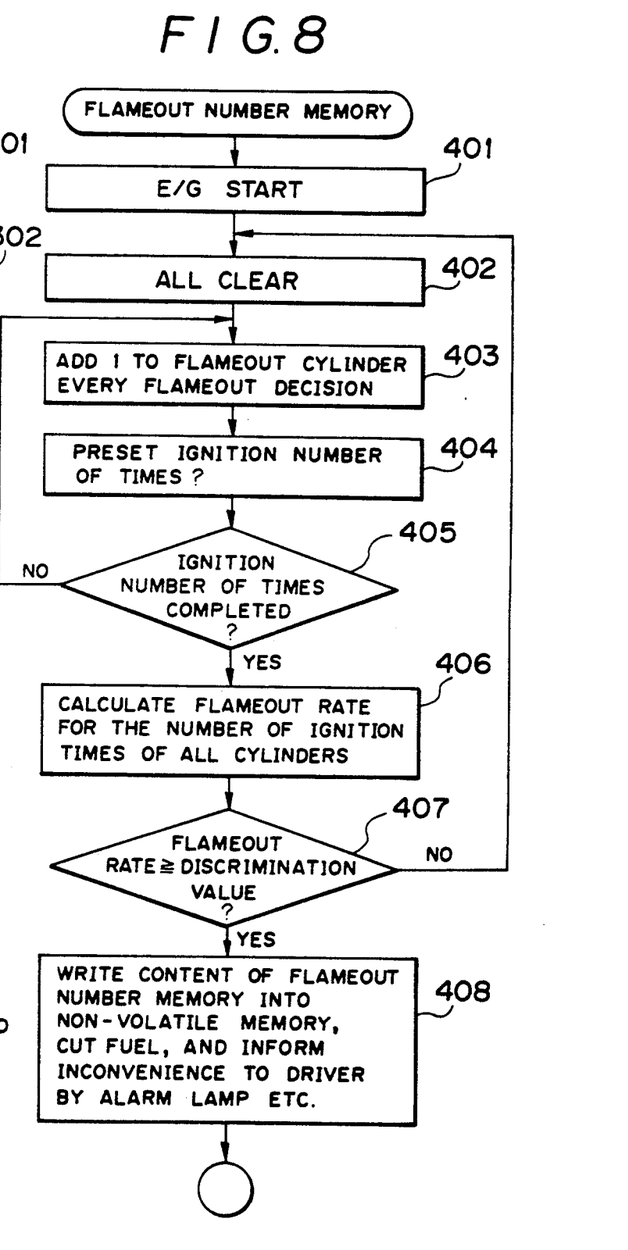
FIG. 8 is a flowchart for explaining how the invention uses a flameout number memory.

The use of the flameout number memory will now be described with reference to the flowchart of FIG. 8.

When the internal combustion engine 2 is started at 401, an all-clear process is executed at 402 to clear all of the functions. Each time a flameout is determined in connection with a particular cylinder, a "1" is added to the flameout number memory corresponding to that particular cylinder (403).

A check is made at 405 to see if the number of ignition times (i.e. ignition occurrences) is equal to a preset number of ignition times obtained at 404. At 405, a check is made to see if the number of ignition occurrences has reached the set number of ignition occurrences and the ignitions have been completed or not. If the result of the discrimination 405 is NO, the processing routine is returned to the adding step 403. If the result of the discrimination 405 is YES, a flameout ratio of the number of flameouts to the number of ignition occurrences of all of the cylinders is calculated at 406. A check is made at 407 to see if the flameout ratio is equal to or larger than a predetermined discrimination value or not.

If the result of the discrimination 407 is NO, the processing routine is returned to the all-clearing step 402 mentioned above. If the result of the discrimination 407 is YES, the contents of the flameout number memory are written into a non-volatile memory, the fuel supply is cut, and an inconvenience is informed to the driver by a warning device such as an alarm lamp or the like (408).

The contents of the above non-volatile memory are read at the time of maintenance in a repair and service factory and are used as data for diagnosis of failures.

Not only the fuel-cut control after determination of the flameout but also a fixed injection control to fix a fuel injection amount to a certain constant value can be executed in the case where, for instance, the flameout ratio is larger than the discrimination value in a manner similar to the ordinary control at the time of a fail safe.

Consequently, the output signal from the A/F sensor 158 when the A/F change amount $\Delta A/F$ is equal to or larger than the flameout discrimination amount DAF is compared with the output signal from the intake pressure sensor 72 by the control means 160. When the A/F change amount $\Delta A/F$ doesn't change at almost the same rate as the intake pressure sensor output signal, it is determined that the internal combustion engine 2 is in the flameout state. Therefore, the flameout is detected early. Due to this, the operation of the fuel system is controlled, the occurrence of the flameout can be prevented, it can be prevented that a large quantity of uncombusted gas is discharged into the atmosphere, deterioration of or damage to the catalyst device 50 by the flameout can be prevented, the durability and operational life of the catalyst device 50 can be improved, and a good exhaust gas purification ratio can be maintained.

At the engine rotational speed of the internal combustion engine 2, the flameout can be detected for an entire rotational speed range, so that a use efficiency of the flameout detecting apparatus can be improved.

Further, since the flameout can be detected by existing sensors without newly providing special sensors, the construction doesn't become complicated. The apparatus can be easily manufactured and costs can be reduced, which is economically advantageous.

As will be obviously understood from the above detailed description, according to the invention, there are provided: the rotational speed sensor to detect the engine rotational speed of the internal combustion engine; the A/F sensor to detect the air-fuel ratio in the exhaust gas; the engine load sensor to detect the load state of the internal combustion engine; and the control means for comparing the output signal from the A/F sensor and the output signal from the engine load sensor when the A/F sensor generates a lean signal, for discriminating the flameout state, and for controlling so as to correct a response speed of the A/F sensor in accordance with the output signals of the rotational speed sensor and the engine load sensor. Therefore, the flameout is detected early and a countermeasure to promptly prevent the flameout can be executed, so that it is prevented that a large quantity of uncombustion gas is discharged into the atmosphere, whereby environmental pollution can be reduced. Deterioration of or damage to the catalyst device can be prevented. The exhaust gas purification ratio is maintained and the durability of the catalyst device can be improved.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. An apparatus for detecting a flameout in an internal combustion engine, comprising: a rotational speed sensor for detecting an engine rotational speed of the internal combustion engine and for generating an electric signal corresponding to the engine rotational speed; an A/F sensor for detecting an air-fuel ratio in the engine exhaust gas and for generating an output electric signal corresponding to the air-fuel ratio; an engine load sensor means for detecting a load state of the internal combustion engine and for generating an output electric signal corresponding to the load state; and control means for comparing the output signal from the A/F sensor with the output signal from the engine load sensor when the A/F sensor output signal indicates a lean air-fuel mixture, for discriminating a flameout state, and for controlling so as to accommodate a response time of the A/F sensor as determined in accordance with the output signals of the rotational speed sensor and the engine load sensor.

2. An apparatus according to claim 1, wherein said internal combustion engine includes a plurality of cylinders in which combustion occurs, and including a cylinder identification means for identifying which cylinder has produced the flameout, and said control means including memory means for maintaining a cumulative record representing the number of flameouts produced by each cylinder.

3. An apparatus according to claim 2, wherein said cylinder identification means includes means for permitting identification of the flameout cylinder during an ignition time period associated with another of the cylinders.

4. An apparatus according to claim 1, wherein said internal combustion engine includes a plurality of cylinders in which combustion occurs, said control means including means for calculating the total number of flameouts which occur during the performance of a predetermined number of cylinder ignitions, and means for providing a fault indication whenever the ratio of flameouts to cylinder ignitions exceeds a predetermined value.

5. An apparatus according to claim 1, wherein said engine load sensor means includes an intake pressure sensor which measures pressure in an intake manifold of the internal combustion engine.

6. An apparatus according to claim 1, wherein said control means includes means responsive to said A/F sensor for identifying a first point in time, after the initial discrimination of a flameout, whereat said air-fuel mixture is becoming richer, and means for measuring a first amount of time which elapses between the initial flameout discrimination and said first point in time.

7. An apparatus according to claim 6, wherein said control means includes means for dividing said first amount of time by said response time of said A/F sensor to obtain a quotient, and means for comparing said quotient to a predetermined value.

8. An apparatus for detecting a flameout in an internal combustion engine, comprising:
load monitor means for monitoring the load on the internal combustion engine;
exhaust gas monitor means for monitoring the air-fuel ratio of exhaust gas produced by the internal combustion engine; and
comparison means for comparing the rate of change of said air-fuel ratio to the rate of change of said engine load.

* * * * *